8073X
J. F. Axtell,
Horse Power,
Patented Mar. 13, 1834.
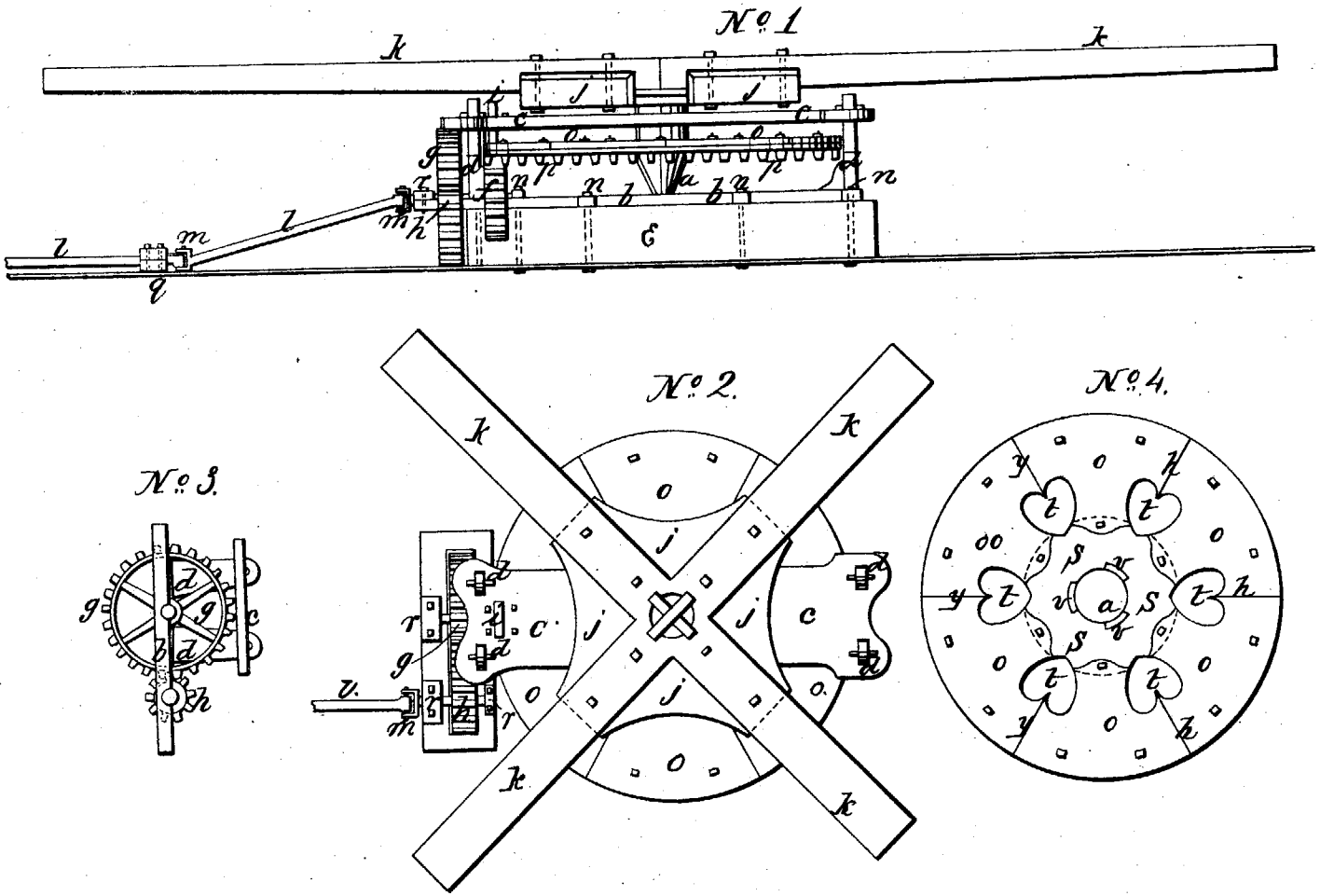
AM. PHOTO-LITHO. CO. N.Y. (OSBORNE'S PROCESS)

Mar. 13, 1834

Jehial F. Aszell Geneva N.Y.

80734

Letters Patent March 13. 1834.

The Schedule referred to in these Letters Patent and making part of the
same Containing a description in the words of the said Jehial F. Aytell
himself of his improvement in the mode and Manner of making "Horse Power
Machines".

To all persons to whom these presents shall come. Jehial F. Aytell of
the Village of Geneva in the County of Ontario and State of New York Mechanic
send greeting Be it known that I the said Jehial F. Aytell have invented
Constructed and made and applied to use a new and useful improvement
in the mode and manner of making Horse Power Machines to be attached
to thrashing Machines or any other Machinery Called "Aytell's Cast Iron Horse
Power" the whole of the same to be made of wrought or cast iron. The advan
-tage of having the Horse Power and Machinery made of iron is its being
Stronger, more durable less liable to go out of order and repair more steady
and regular in its operation and altho' of greater Strength and power it is
of less size more compact, takes up less room and is more easily transported
from place to place if required the advantages above recited. the small
Compass of the machine the durability of its material the facility with which
it can be moved and put in operation its great strength and the low price
for which it can be obtained gives the said Horse Power a decided advan
-tage and superiority over any other now in use The draft of the Horse
Power hereto attached and described as plates No. 1.2.3.4. the lettering
thereof together with the specification and description of the same as given
below particularly set forth and describe the different parts of the machine
the distinct operation and use of each part and the effect produced when put
in operation The improvement claimed is in making the Horse Power of iron
instead of wood or other materials and for the manner in which the same
is put together Plate No. 1
Is an upright right, right hand view of the Horse Power Machine lettered
and described as follows Letter a an upright view of the Shaft to which

[illegible]

8073X to which is attached Cog wheel o.o. and p.p. by means of a plate or flange cast
with and Connected to the Shaft as represented by s.s. in plate No. 4 _ on the top of
which is a Collar represented by j.j. in plates Nos 1 and 2. to which is attached
the levers that move and propel the Machine and represented by k.k. in plates
Nos 1 and 2. the bottom of the Shaft resting on plate b.b. and running on a pivot
supported at top by plate c.c. and regulated by keys or wedges as represented by
letters v. v. v. in plate No. 4. Letters b.b. The bottom plate from one to two in
=ches thick and 10 inches wide or thereabouts said plate made permanent and
supporting Shaft a. at the bottom in which plate the bottom of Shaft a. rest and
moves on a pivot when in operation _ said bottom plate being made fast to the
foundation as represented by letter E.

c.c. the top plate supporting Shaft a.
which more plainly appears in plate No. 2. letters c.c. in which is a traveller or
friction wheel which is represented in plates No. 1 and 2 and marked letter
i. which rolling on the upper edge of Cog wheel o.o. and p.p. regulates the mash
=ing of the Cogs of the main wheel into the cogs of pinion wheel f. d.d. the upright
posts connecting plate b.b. with plate c.c. as will more plainly appear in plate No.
3 letters d.d. E. the foundation on which the machine is placed. f. the pinion
wheel mashing into main wheel o.o. & p.p. on the shaft of which is spur wheel
g.g. as represented by said letters g. in Plates No. 1 2 and 3. g.g. the spur wheel as
before mentioned attached to the Shaft of pinion wheel f. and mashing into pin
=ion wheel h as represented by letter h. in plates No. 1 2 3. h the pinion wheel
mashing into Spur wheel g. as will plainly appear in plate No. 3. letter h. on the
end of the Shaft of which is a universal joint connecting with line Shaft l. l.
which when moved propels the machine. i a small friction wheel or traveller
running on top plate c.c. regulating the gearing of main wheel o.o. and p.p.
into pinion wheel f. j.j. the collar on top of Shaft a. connected as will appear by the
top of Shaft letter a. in plate No. 2 to which is attached the levers k.k. in plates No.
1 and 2. k.k. the levers as before described to which the power is applied. l.l. the
line shafts connected by universal joints and which may lay in any angle
and Connecting the horse power with any other machine. m. m. the univer
=sal joints connecting line shafts l.l. n.n. n.n. bolt heads or nuts fastening the
machine to its foundation through bottom plate b.b. o.o. the body of the main wheel as will more plainly appear in plates No 2 and 4. and which may be cast
whole or in segments or either attached to the shaft, or separate if cast in segments
its description will plainly appear by lines y.y.y.y.y.y.y.y. in plate No 4. Letters p.p.
the Cog Wheel cast whole or in segments and attached to the body of the main
wheel o.o. by bolts or screws and nuts. q. Coupling or box in which line shaft runs
r. the cap or binder confining the shaft of the machine to the boxes or places in which
it moves as represented by letters r r r in plate No. 2

Plate No 2

A horizontal view of the top part of the machine Letter a. the top of main shaft
c c the top plate d.d.d.d. Mortises for the uprights or posts as represented by letters
d.d. in plate No 1. f g. the Spur wheel as more plainly appears by letters g.g. in
plate No 3. h the pinion wheel as will also appear by letter h. in plate No. 3.
i. the Mortise in top plate c. in which the traveller or friction wheel runs.
j.j.j.j. the Collar on top of shaft a, on which rest the levers k.k.k.k. k.k.k.k. the
levers fastened to collar j.j.j.j. by bolts or screws as represented by square dots. l.
the end of line shaft. m the universal joint. o the body plate of the main wheel
cast whole or in segments. r.r.r. the caps or binders confining the shaft in place Plate No 3

An upright end view of the Horse Power and Machine. Letter b the bottom
plate. c the top plate, d.d. the upright posts or pillars. g.g. the Spur wheel mesh-
ing into pinion wheel h. h the pinion wheel.

Plate No 4

A horizontal view of the top of the main Cog wheel. Letter a. represents the
manner in which the main shaft a. in plate No 1 passes through the top plate
c.c. in plate No. 2 and regulated by keys and wedges, as represented by
letters t.t.t. o.o.o.o.o.o. the body plate of the main wheel cast whole or in
segments the segments or division being represented by lines y.y.y.y.y.y.
s.s.s. the flange or plate cast solid with main shaft a. Plate No 1 to which the
body of the main wheel is attached by bolts as represented by square dots the cir-
cular dotted line represents the bottom edge of the flange and the semi circle
line represents the rabbit in the flange which receives the body of the main
wheel. Letters t.t.t.t.t.t. open spaces in the form of a heart or other shape there
by saving metal and lessening the weight of the wheel. t.t.t. keys or wedges confining and regulating main shaft in top plate c.c. in plates No 1 and 2.
y.y.y.y.y.y. division of segments when body plate of [illegible] wheel is cast in segments
The square dots in plates No 2 and 4. represent bolt heads [illegible] by which the
machine is connected together In testimony that the above is a true spe-
cification of my said improvement as above described I have hereunto set my
hand this Seventh day of May AD 1833 at Geneva County of Ontario and
State of New York Witnesses
Exd. Samuel Mott
W.G. Eurotas Hastings Uriah F. Hotell [illegible]

Drawing 1680.w.i.